US011938350B2

(12) United States Patent
Jones et al.

(10) Patent No.: US 11,938,350 B2
(45) Date of Patent: Mar. 26, 2024

(54) FALL ARREST DEVICE WITH CONTROLLED RETRACTION SPEED

(71) Applicant: Latchways Plc, Devizes (GB)

(72) Inventors: Karl Jones, Devizes (GB); Owain Jones, Devizes (GB); Nathan Wright, Devizes (GB)

(73) Assignee: Latchways plc, Devizes (GB)

(*) Notice: Subject to any disclaimer, the term of this patent is extended or adjusted under 35 U.S.C. 154(b) by 35 days.

(21) Appl. No.: 16/347,280

(22) PCT Filed: Nov. 20, 2017

(86) PCT No.: PCT/GB2017/053478
§ 371 (c)(1),
(2) Date: May 3, 2019

(87) PCT Pub. No.: WO2018/096320
PCT Pub. Date: May 31, 2018

(65) Prior Publication Data

US 2019/0275356 A1 Sep. 12, 2019

(30) Foreign Application Priority Data

Nov. 23, 2016 (GB) ..................................... 1619805

(51) Int. Cl.
*A62B 1/10* (2006.01)
*A62B 35/00* (2006.01)
*A62B 35/04* (2006.01)

(52) U.S. Cl.
CPC ............ *A62B 1/10* (2013.01); *A62B 35/0093* (2013.01); *A62B 35/04* (2013.01)

(58) Field of Classification Search
CPC ....... A62B 1/10; A62B 35/0093; A62B 35/04; A62B 1/06; A62B 1/08; B65H 75/4418;
(Continued)

(56) References Cited

U.S. PATENT DOCUMENTS 197,899 A * 12/1877 Root ........................ A62B 1/12 188/270
1,875,335 A * 9/1932 Holmes ................... E21C 29/10 299/49
(Continued)

FOREIGN PATENT DOCUMENTS

CN 102215915 A 10/2011
CN 105987157 A 10/2016
(Continued)

OTHER PUBLICATIONS

China Patent Office, Decision of Rejection, CN2017800722832, dated Apr. 19, 2022.
(Continued)

*Primary Examiner* — Daniel P Cahn
*Assistant Examiner* — Shiref M Mekhaeil
(74) *Attorney, Agent, or Firm* — Jones Day

(57) ABSTRACT

A fall arrest device, such as a self-retracting lanyard (or lifeline) including: a rotatable drum for winding a lifeline; and a brake arrangement comprising a rotatable brake body arranged to rotate in response to rotation of the drum; wherein rotation of the rotatable brake body applies a braking force to the drum as the lifeline is being retracted onto the drum.

12 Claims, 4 Drawing Sheets

(58) Field of Classification Search
CPC ............ B65H 75/4428; B65H 75/4434; B65H 75/4436; B65H 75/4442; B65H 75/4447; B65H 75/4452
USPC ...... 242/381, 381.5, 381.4, 385, 385.3, 396, 242/396.3, 396.5
See application file for complete search history.

(56) References Cited

U.S. PATENT DOCUMENTS 2,761,650 A * 9/1956 Faugier .................... A62B 1/10 254/377
2,791,397 A * 5/1957 Coffman ............ A62B 35/0093 182/239
3,052,426 A * 9/1962 Avis ......................... B66D 1/02 242/378
3,596,849 A * 8/1971 Tamarin ................. H02G 11/02 242/385.1
3,985,047 A * 10/1976 Therkelsen .............. B66D 1/14 254/354
4,018,423 A * 4/1977 Belew ...................... A62B 1/12 188/291
4,026,385 A * 5/1977 Murukurthy ............. A62B 1/10 182/7
4,446,884 A 5/1984 Rader, Jr.
4,448,284 A * 5/1984 Ciabo ...................... A62B 1/10 181/234
4,456,195 A * 6/1984 Takada .................. B60R 22/405 242/383.1
4,489,919 A * 12/1984 Ostrobrod ................ B66D 5/04 182/232
4,657,201 A * 4/1987 Munroe ................. A01K 89/05 242/301
4,846,313 A * 7/1989 Sharp ................. A62B 35/0093 242/396.5
4,938,435 A * 7/1990 Varner ..................... A62B 1/08 182/5
5,348,117 A * 9/1994 Pickering ................. A62B 1/14 182/5
5,624,085 A * 4/1997 Usami .................. G01B 3/1005 33/767
5,799,342 A * 9/1998 Last ........................ E04H 4/101 4/502
5,984,276 A 11/1999 Green
6,810,997 B2 * 11/2004 Schreiber ................. A62B 1/10 182/233
7,281,620 B2 * 10/2007 Wolner ................. F16D 63/006 192/223.1
8,245,817 B2 * 8/2012 Casebolt .................. A62B 1/10 182/75
9,121,462 B2 * 9/2015 Casebolt ............ A62B 35/0093
9,132,301 B2 9/2015 Jones et al.
9,205,285 B2 * 12/2015 Jones ................. A62B 35/0043
9,618,891 B1 * 4/2017 Fahmy ............... G03G 15/5008
9,656,832 B2 * 5/2017 Morgan ............. B65H 75/4447
9,764,172 B2 * 9/2017 Wolner .............. A62B 35/0093
10,065,053 B2 * 9/2018 Verstegen ................ A62B 1/10
10,357,670 B2 * 7/2019 Wu ........................ B65H 75/48
10,485,998 B2 * 11/2019 Jones ................. A62B 35/0018
10,688,323 B2 * 6/2020 Wolner .................... A62B 1/10
2002/0179372 A1 * 12/2002 Schreiber ................. A62B 1/10 182/238
2009/0084631 A1 * 4/2009 Casebolt .................. A62B 1/10 182/235
2010/0224448 A1 * 9/2010 Wolner .................... A62B 1/10 182/234
2010/0226748 A1 * 9/2010 Wolner .............. A62B 35/0093 414/815
2010/0282541 A1 * 11/2010 Renton .................... A62B 1/18 182/234
2010/0308149 A1 * 12/2010 Allington ................ F16D 59/00 242/379
2011/0147125 A1 * 6/2011 Blomberg ............ H02K 49/043 188/161
2012/0104139 A1 * 5/2012 Davis ................. B65H 75/4444 242/396
2013/0105247 A1 * 5/2013 Casebolt .................. A62B 1/10 188/185
2013/0206510 A1 * 8/2013 Casebolt ............ A62B 35/0093 182/241
2013/0248291 A1 * 9/2013 Jones ................. A62B 35/0043 182/241
2014/0117136 A2 * 5/2014 Morgan ............. B65H 75/4447 242/381.5
2014/0190770 A1 * 7/2014 Renton .................. A62B 35/04 182/236
2014/0251731 A1 * 9/2014 Jones ................. A62B 35/0068 182/231
2014/0262616 A1 * 9/2014 Cullum ................... E06C 7/188 242/384.7
2018/0015312 A1 * 1/2018 Jones ..................... A62B 35/04
2018/0028844 A1 2/2018 Wu
2019/0209877 A1 * 7/2019 Farrell .................. F16D 63/008

FOREIGN PATENT DOCUMENTS

WO 2008007119 A1 1/2008
WO 2016120614 A1 8/2016
WO 2016127946 A1 8/2016

OTHER PUBLICATIONS

China Patent Office; Fourth Office Action, CN2017800722832, dated Sep. 20, 2022.

* cited by examiner

FALL ARREST DEVICE WITH CONTROLLED RETRACTION SPEED

CROSS REFERENCE TO RELATED APPLICATIONS

This application is the United States national phase of International Application No. PCT/GB2017/053478 filed Nov. 20, 2017, and claims priority to GB Patent Application No. 1619805.3, filed Nov. 23, 2016, entitled "Self-Retracting Lifeline Fall Arrest Device," the entire contents of each of which are hereby incorporated by reference in their entirety.

BACKGROUND OF THE INVENTION

Field of the Invention

The present invention relates generally to a fall arrest system and a fall arrest device, and in particular to a brake arrangement for a fall arrest device, such as a self-retracting lanyard.

Description of the Related Art

Fall arrest systems are used to prevent personnel working at height from suffering injury as a result of falling or other such events. Fall arrest systems are often referred to as height safety systems or fall prevention systems. Frequently, such systems and devices include a safety block arranged to be suspended overhead from an anchor structure. Such arrangements typically include: a drum upon which a safety line or lifeline is wound; a speed responsive mechanism arranged to inhibit the drum rotation above a predetermined rotational speed; and an energy absorber device arranged to be activated if a load above a predetermined threshold is deployed when the speed responsive mechanism is deployed.

A self-retracting lanyard (or lifeline) (SRL) is a fall arrest device that includes a rewinding mechanism configured to automatically pay out and retract the lifeline as necessary to allow the user movement while keeping the lifeline taut. The drum upon which the lifeline is wound is, therefore, biased to rewind the lifeline onto the drum.

Typically, the safety line is attached to the user by a connector, such as a clamp or clip, fixed to the end of the safety line. The user may wear a harness which receives the connector. When the user detaches the connector and releases the safety line, the safety line is rewound onto the drum. Due to the biasing of the rewinding mechanism, the drum may "freewheel" when winding the safety line onto the drum, which can cause the safety line to be retracted at high velocities. This uncontrolled retraction of the safety line may damage external and internal components of the SRL, the connector, and/or the housing of the SRL, as the connector often impacts the housing. This damage may be particularly significant when the user is a large distance away from the drum when releasing the safety line.

SUMMARY OF THE INVENTION

Accordingly and generally, provided are an improved brake arrangement for a fall arrest system and device and an improved fall arrest system and device.

In a non-limiting embodiment or aspect, provided is a fall arrest device comprising: a rotatable drum for winding a lifeline; and a brake arrangement comprising a rotatable brake body arranged to rotate in response to rotation of the drum; wherein rotation of the rotatable brake body applies a braking force to the drum as the lifeline is being retracted onto the drum.

In a non-limiting embodiment or aspect, the rotational axis of the rotatable brake body is spaced from the rotational axis of the drum. In a non-limiting embodiment or aspect, the rotatable brake body engages the rotatable drum, such that the rotatable drum drives the rotation of the brake body.

In a non-limiting embodiment or aspect, the rotational axis of the rotatable drum and the rotational axis of the rotatable brake body are aligned in the same direction.

In a non-limiting embodiment or aspect, the rotatable drum is provided with a driver portion which drives the rotation of the rotatable brake body, the driver portion arranged to be rotated by the drum. In a non-limiting embodiment or aspect, the driver portion is a drive ring which is coaxial with the drum. In a non-limiting embodiment or aspect, the driver portion is a drive ring having a rotational axis that is coaxial with the rotational axis of the drum. In a non-limiting embodiment or aspect, the driver portion is the circumferential perimeter of the drum. In a non-limiting embodiment or aspect, one or both of the driver portion and the rotatable brake body have gear or cog rings that operate to drive the rotatable brake body.

In a non-limiting embodiment or aspect, the brake arrangement is a centrifugal brake arrangement. In a non-limiting embodiment or aspect, the centrifugal brake arrangement comprises at least one brake shoe slidably and/or float mounted on the rotatable brake body, wherein in response to rotation of the rotatable brake body the at least one brake shoe is configured to slidably move outwards from an inactive position towards an active position, wherein in the active position the at least one brake shoe contacts an abutment surface which slows the rotation of the rotatable brake body. In a non-limiting embodiment or aspect, the at least one brake shoe is slidably and/or float mounted on a rotatable seat driven by the rotatable brake body.

In a non-limiting embodiment or aspect, the abutment surface is a brake lining.

In a non-limiting embodiment or aspect, the fall arrest device further comprises a re-winding mechanism configured to rewind the lifeline onto the drum.

In a non-limiting embodiment or aspect, the rotatable brake body applies a braking force when the drum rotates in a first direction to rewind the lifeline onto the drum but not when the drum rotates in a second direction to pay out the lifeline. In a non-limiting embodiment or aspect, the brake arrangement comprises a one-way bearing or sprag clutch in communication with the rotatable brake body, such that the rotatable brake body freewheels when the drum rotates in the second direction.

In a non-limiting embodiment or aspect, the drum is mounted on a rotatable shaft, and the device further comprises a speed responsive mechanism arranged to stop the drum or shaft rotation above a predetermined rotational speed. In a non-limiting embodiment or aspect, the speed responsive mechanism is separate from the brake arrangement. In a non-limiting embodiment or aspect, the fall arrest device further comprises an energy absorber device arranged to be activated if a load above a predetermined threshold is deployed when the speed responsive mechanism is deployed. In a non-limiting embodiment or aspect, the speed responsive mechanism comprises: a stop; a pawl carrier arranged to rotate with the drum; and at least one pawl pivotally-mounted on the pawl carrier, wherein each pawl is biased inwards by a pawl biasing member towards an inactive position in which the pawl does not contact the stop, wherein when the drum reaches a threshold rotational speed, the at least one pawl pivots outwards against the force of the pawl biasing member into an active position such that the at least one pawl cannot rotate past the stop. In a non-limiting embodiment or aspect, the energy absorber device comprises a resilient energy absorber ring.

The drum can be of any size and the term "drum," for the purposes of definition, may be used interchangeably with spool, reel, and/or other device upon which a safety line can be wound.

Optionally, the rotatable brake body may engage the rotatable drum. For example, a circumferential portion of the rotatable brake body may contact a circumferential portion of the drum. Thus, the drum may directly drive the rotation of the rotatable brake body. In this example the rotatable brake body will rotate in the opposite direction to the drum.

Advantageously, the amount of the braking force transferred from the rotatable brake body to the drum may depend on the relative sizes of the drum and the rotatable brake body. This is due to the spacing of the rotational axes of the drum and the rotatable brake body. To increase the braking force on the drum, the size of the rotatable brake body relative to the drum may be increased.

The rotatable brake body may directly engage a surface of the drum. Optionally, the device may comprise an annular member mounted on the drum. The rotatable brake body may contact the annular member, which may reduce the risk of the surface of the drum being damaged or worn by the brake arrangement.

Optionally, the rotational axis of the rotatable brake body may be aligned in the same direction as the rotational axis of the drum. For example, the rotational axes may be parallel. The rotatable brake body may be offset from the drum. Optionally, the rotatable drum may be provided with a driver portion which drives the rotation of the rotatable brake body, the driver portion arranged to be rotated by the drum. For example, the driver portion may engage the drum, or the annular member mounted on the drum, and the rotatable brake body may engage the driver portion. The driver portion may be a drive ring which is coaxial with the drum. Optionally, the driver portion may be mounted on the same rotary shaft as the drum, and/or the driver portion may be connected to the drum. The driver portion may be a drive ring having a rotational axis that is spaced from the rotational axis of the drum. For example, the driver portion may be positioned between the drum and the rotatable brake body. Optionally, the driver portion may be the circumferential perimeter of the drum.

In a non-limiting embodiment or aspect, the driver portion and the rotatable brake body may have respective gear rings that operate to drive the rotatable brake body. The gears may comprise a plurality of teeth. The teeth of the driver portion may mesh with the teeth of the rotatable brake body. An intermediate gear may be provided intermediate the rotatable brake body and the drum.

If the rotatable brake body is driven directly by the driver portion, then the amount of the braking force transferred from the rotatable brake body to the drum depends, at least in part, on the relative sizes (diameters) of the driver portion and the rotatable brake body. To increase the braking force on the drum, the size of the rotatable brake body relative to the driver portion may be increased. In a non-limiting embodiment or aspect, the driver member and/or the rotatable brake body may be a roller.

The brake arrangement may be a centrifugal brake arrangement. For example, the centrifugal brake arrangement may further comprise at least one brake shoe slidably mounted on the brake body. In response to rotation of the brake body the at least one brake shoe may be configured to slidably move outwards from an inactive position towards an active position, wherein in the active position the at least one brake shoe contacts an abutment surface which slows the rotation of the brake body. This then, directly or indirectly, causes the rotatable brake body to apply a frictional braking force to the drum.

The at least one brake shoe may be slidably mounted on a rotatable seat. The rotatable seat may be driven by the brake body. For example, the rotatable seat may be mounted on the brake body. Advantageously, the brake shoes may be free to slide relative to the rotatable seat, such that no biasing members are required. This may make the device more robust and reliable, as biasing members such as springs are often prone to failure over time.

In a non-limiting embodiment or aspect, the, or each brake shoe may be biased towards the inactive position by a respective biasing member. Each biasing member may be a spring, such as a leaf spring or a coil spring. In a non-limiting embodiment or aspect, the abutment surface may be a brake lining. The brake lining may substantially surround the rotatable brake body. In a non-limiting embodiment or aspect, other centrifugal braking arrangements are used.

The rotatable brake body and/or the driver portion may be configured to rotate in both a clockwise and a counter clockwise direction; in other words, the rotatable brake body and the driver portion may be bi-directional. This may be advantageous as it allows the brake arrangement to reduce the rotational speed of the drum, both when the lifeline is retracted and paid out of the device.

Optionally, the rotatable brake body may only apply a braking force, either directly or indirectly, to the drum when the drum rotates in a first direction. The drum may rotate in the first direction to rewind the safety line onto the drum. Optionally, the device may further comprise a one-way bearing or sprag clutch in communication with the rotatable brake body, such that the rotatable brake body freewheels when the drum rotates in a second direction opposite to the first direction. Optionally, when the drum rotates in the second directionm, the rotatable brake body may be moved out of engagement with the driver portion and/or the drum, such that the brake body is not rotated.

The fall arrest device may comprise a speed responsive mechanism arranged to inhibit the drum rotation above a predetermined rotational speed. This speed responsive engagement mechanism is provided separate from and in addition to the brake arrangement. Any known speed responsive mechanism may be used. The fall arrest device may comprise an energy absorber device arranged to be activated if a load above a predetermined threshold is deployed when the speed responsive mechanism is deployed. Any known energy absorber device may be used.

Optionally, the speed responsive mechanism may comprise a ratchet and pawl arrangement. For example, the speed responsive mechanism may comprise the ratchet and pawl arrangement disclosed in WO 2008/007119, the disclosure of which is incorporated herein by reference.

In a non-limiting embodiment or aspect, the speed responsive mechanism may comprise a rotatable pawl carrier and at least one pawl pivotally-mounted on the pawl carrier, as described in detail in WO 2016/120614, the disclosure of which is incorporated herein by reference.

The pawl carrier may be configured to rotate with the drum. The device may comprise a mechanical stop. Optionally, the stop may be integral to, or attached to a chassis frame of the device. The, or each, pivotable pawl may be biased inwards towards an inactive position by a respective biasing member. Each biasing member may be a spring, such as a leaf spring or coil spring.

When the lifeline is retracted or paid out from the drum at a speed which is lower than a predetermined threshold, the at least one pawl may remain in the inactive position and the pawl carrier simply rotates past the stop. In response to the drum reaching the threshold rotational speed, the pawl carrier and the at least one pawl may be rotated against the biasing force of each biasing member. This causes each pawl to pivot outwards into an active position. In this active position the pawl(s) cannot rotate past the stop and so the pawl carrier quickly locks against the stop, thereby preventing the drum from rotating and arresting a user's decent.

Due to the weight of the user, the drum may continue to rotate relative to the locked pawl carrier. This is when the energy absorber device may be activated. Optionally, the energy absorber device may comprise a resilient energy absorber ring as is fully disclosed in WO 2016/120614, the disclosure of which is incorporated herein by reference.

In a non-limiting embodiment or aspect, the pawl carrier may have a central aperture which is fitted to the energy absorber ring. Optionally, a portion of the rotary shaft that extends outwardly from an outer wall of the drum may include or may be in the form of a collar to which the energy absorber ring is mounted. In a non-limiting embodiment or aspect, the device may comprise a re-winding arrangement configured to rewind the lifeline onto the drum. The rewinding arrangement may include a drum biasing member configured to urge the drum in a first direction to rewind the lifeline onto the drum. The rewinding arrangement may keep the lifeline taut during use.

In one non-limiting embodiment or aspect, the device may be configured to be suspended from an anchor structure. Further, the lifeline may be in the form of a cable, a line, a filament, a strap, webbing, a belt, or any other product or material that can be used as a safety or lifeline.

Further embodiments or aspects will now be described in the following numbered clauses.

Clause 1: A fall arrest device, comprising: an extendable and retractable lifeline wound about a rotatable drum; and a brake arrangement comprising a rotatable brake body arranged to rotate in response to rotation of the drum; wherein rotation of the rotatable brake body applies a braking force to the drum as the lifeline is being retracted onto the drum.

Clause 2: The fall arrest device of clause 1, wherein the rotational axis of the rotatable brake body is spaced from the rotational axis of the drum.

Clause 3: The fall arrest device of clause 1 or 2, wherein the rotatable brake body engages the rotatable drum, such that the rotatable drum drives the rotation of the brake body.

Clause 4: The fall arrest device of any of clauses 1-3, wherein the rotational axis of the rotatable drum and the rotational axis of the rotatable brake body are aligned in the same direction.

Clause 5: The fall arrest device of any of clauses 1-4, further comprising a driver portion directly or indirectly attached to and configured to rotate with the rotatable drum, the driver portion configured to drive the rotation of the rotatable brake body.

Clause 6: The fall arrest device of any of clauses 1-5, wherein the driver portion comprises a drive ring arranged substantially coaxially with the drum.

Clause 7: The fall arrest device of any of clauses 1-6, wherein the driver portion comprises a drive ring having a rotational axis that is coaxial with the rotational axis of the drum.

Clause 8: The fall arrest device of any of clauses 1-7, wherein the driver portion comprises circumferential perimeter of the drum.

Clause 9: The fall arrest device of any of clauses 1-8, wherein at least one of the driver portion and the rotatable brake body have gear or cog rings configured to drive the rotatable brake body.

Clause 10: The fall arrest device of any of clauses 1-9, wherein the brake arrangement is a centrifugal brake arrangement.

Clause 11: The fall arrest device of any of clauses 1-10, wherein the centrifugal brake arrangement comprises at least one brake shoe slidably and/or float-mounted on the rotatable brake body, wherein, in response to rotation of the rotatable brake body, the at least one brake shoe is configured to slidably move outwards from an inactive position towards an active position, wherein in the active position the at least one brake shoe contacts an abutment surface, which slows the rotation of the rotatable brake body.

Clause 12: The fall arrest device of any of clauses 1-11, wherein the at least one brake shoe is slidably and/or float-mounted on a rotatable seat driven by the rotatable brake body.

Clause 13: The fall arrest device of any of clauses 1-12, wherein the abutment surface comprises a brake lining.

Clause 14: The fall arrest device of any of clauses 1-13, further comprising a re-winding mechanism configured to rewind the lifeline onto the drum.

Clause 15: The fall arrest device of any of clauses 1-14, wherein the rotatable brake body applies a braking force only when the drum rotates in a first direction to rewind the lifeline onto the drum.

Clause 16: The fall arrest device of any of clauses 1-15, wherein the brake arrangement comprises a one-way bearing or sprag clutch in operational communication with the rotatable brake body, such that the rotatable brake body freewheels when the drum rotates in a second direction opposite the first direction.

Clause 17: The fall arrest device of any of clauses 1-16, wherein the drum is mounted on a rotatable shaft, and the fall arrest device further comprises a speed responsive mechanism arranged to stop the drum or shaft rotation above a predetermined rotational speed.

Clause 18: The fall arrest device of any of clauses 1-17, wherein the speed responsive mechanism is separate from the brake arrangement.

Clause 19: The fall arrest device of any of clauses 1-18, further comprising an energy absorber device arranged to be activated if a load above a predetermined threshold is deployed when the speed responsive mechanism is deployed.

Clause 20: The fall arrest device of any of clauses 1-19, wherein the energy absorber device comprises a resilient energy absorber ring.

Clause 21: The fall arrest device of any of clauses 1-20, wherein the speed responsive mechanism comprises: a stop; a pawl carrier arranged to rotate with the drum; and at least one pawl pivotally-mounted on the pawl carrier, wherein each pawl is biased inwards by a pawl biasing member towards an inactive position in which the pawl does not contact the stop, wherein when the drum reaches a threshold rotational speed, the at least one pawl pivots outwards against the force of the pawl biasing member into an active position such that the at least one pawl cannot rotate past the stop.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise. Preferred features will be elucidated in the claims and in the specific description of the embodiments that follow. It will be readily appreciated that preferred features of certain aspects or embodiments could be usefully incorporated in other described embodiments even if not specifically described in those terms herein.

DETAILED DESCRIPTION OF THE INVENTION

Figure 1:
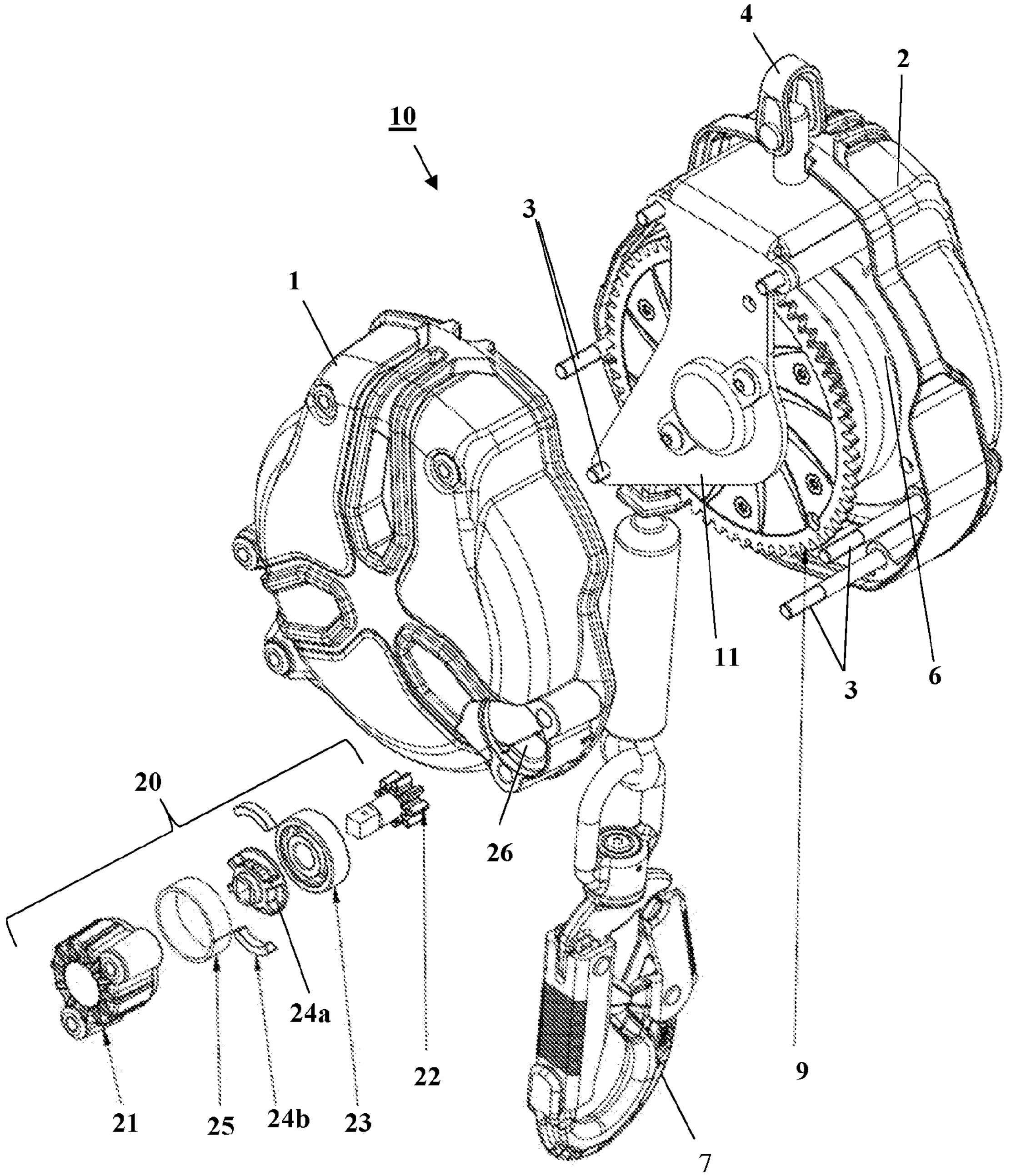
FIG. 1 is a perspective view of a fall arrest device according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing FIGS. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

In a non-limiting embodiment or aspect, the present invention is directed to a fall arrest device 10, as illustrated in FIGS. 1-4*b*. As discussed, the fall arrest device may be in the form of a self-retracting lanyard (or lifeline) device.

In a non-limiting embodiment or aspect, the fall arrest device 10 includes a housing, including a front cover 1 and a main housing 2. The front cover 1 is secured to the main housing by six fasteners 3, such as bolts. In other non-limiting embodiments or aspects, more or fewer fasteners may be used, or the front cover 1 may attach by a snap-fit arrangement to the main housing 2. A chassis frame 11 is attached to, or integral with, the housing 2, and a suspension attachment eyelet 4 is positioned at the top of the main housing 2 via the chassis frame 11 and provides an attachment means for suspension of the fall arrest device 10 from an anchor structure (not shown).

In a non-limiting embodiment or aspect, mounted inside the housing, between plates of the chassis 11, is a rotary shaft 5 (see FIGS. 2 and 4). A rotatable drum 6, around which a lifeline (not shown) is wound, is mounted on the rotary shaft 5, and a connector 7 is attached to an end of the lifeline. The connector 7 is suitable for clipping to a safety harness (not shown).

In a non-limiting embodiment or aspect, a drum gear 9 is mounted on the rotary shaft coaxially with the rotatable drum 6. The drum gear 9 is configured to rotate with the drum 6 in a first direction in response to the lifeline being rewound onto the drum 6 and in a second direction in response to the lifeline being paid out. The drum gear 9 could be integrally formed with a rim of the drum 6 or fitted to a rim of the drum 6. Alternatively, an annular gear rim could be positioned to the side of the drum to rotate in unison with the drum 6. The drum gear 9 is configured to engage (and drive) a centrifugal brake arrangement 20, as will be described hereinafter.

In a non-limiting embodiment or aspect, the centrifugal brake arrangement 20 includes a brake housing 21 configured to house certain components including a brake gear 22. The brake gear 22 is effectively a rotatable brake body, and the drum gear 9 is a drive element or driver portion arranged to rotatably drive the rotation of the brake gear 22. In a non-limiting embodiment or aspect, the rotational axis of the brake gear 22 is parallel to, but positionally spaced (or offset) from, the coaxial rotational axis of the drum 6 and drum gear 9.

In a non-limiting embodiment or aspect, mounted on the shaft of the brake gear 22 is a retainer 23, a rotatable seat 24*a*, and a brake lining 25. A pair of "floating" brake shoes 24*b* are mounted on the rotatable seat 24*a*. These brake shoes 24*b* are floating in the sense that they are able to move radially with respect to the rotational axis of the brake gear 22 dependent upon rotational speed. In a non-limiting embodiment or aspect, only one brake shoe, or more than two brake shoes, may be provided.

In a non-limiting embodiment or aspect, the rotatable seat 24*a* has a square central bore arranged to receive the square 'key' end of the shaft of the brake gear 22 so as to ensure that the rotatable seat 24*a* rotates in unison with the brake gear 22. The retainer 23 retains the lining 25, and the retainer 23 and brake lining 25 do not rotate with the brake gear 22. The brake shoes 24*b* rotate in an annular space defined by the retainer 23, around the rotational axis of the brake gear 22, as they are driven by lugs on the seat 24*a*. The brake shoes 24*b* are able to "float" radially dependent upon the rotational speed of the brake gear 22. In a non-limiting embodiment or aspect, the brake arrangement 20 (except for housing 21) is inserted into an aperture 26 in the front cover 1 of the fall arrest device 10.

Figure 2A:
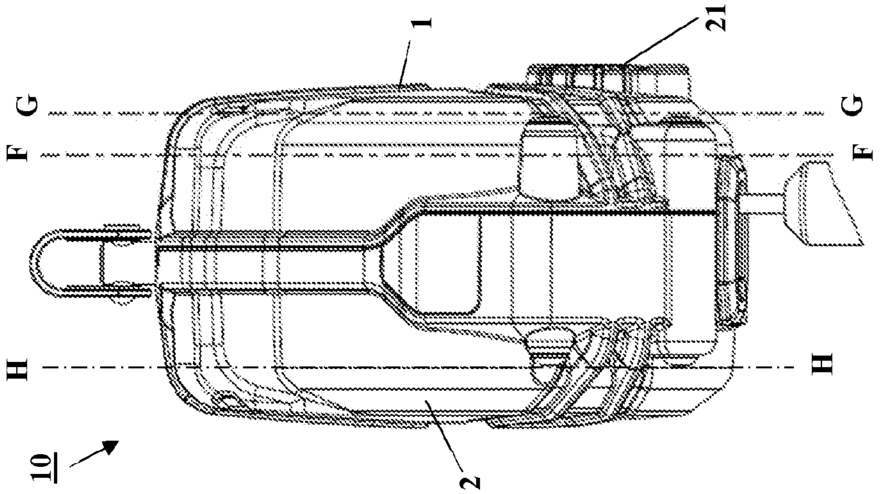
FIG. 2*a* is a side view of the fall arrest device of FIG. 1.
Figure 2B:
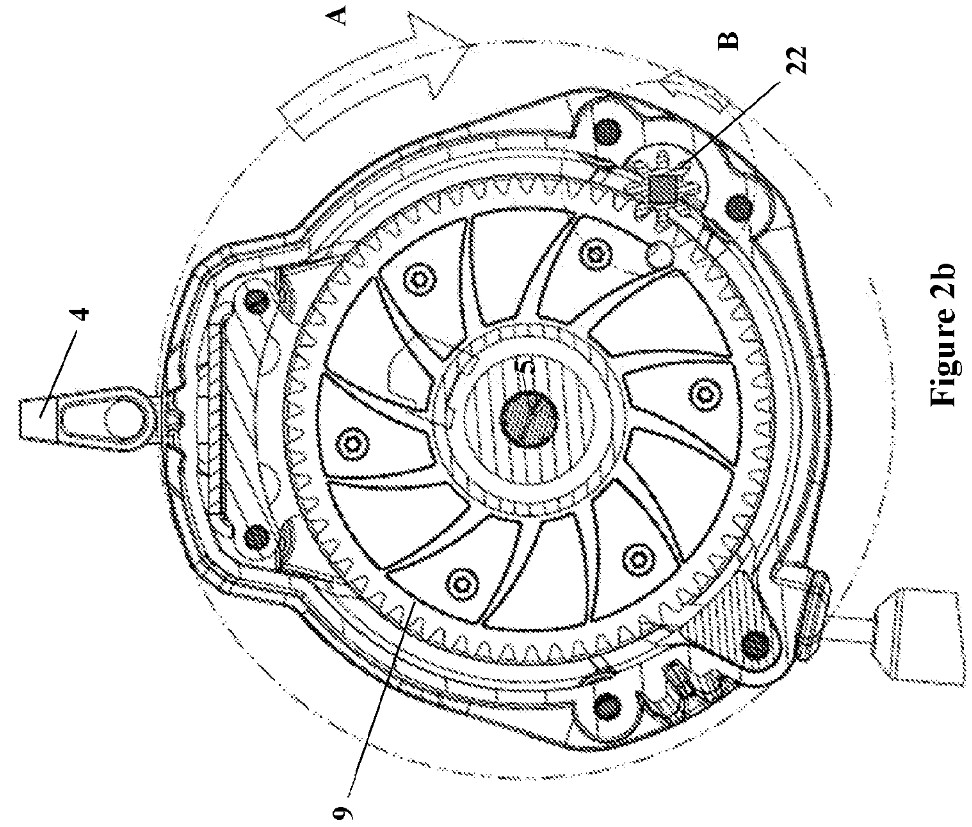
FIG. 2*b* is a front view of a cross-section through line F-F of the fall arrest device in FIG. 2*a;*
Figure 2C:
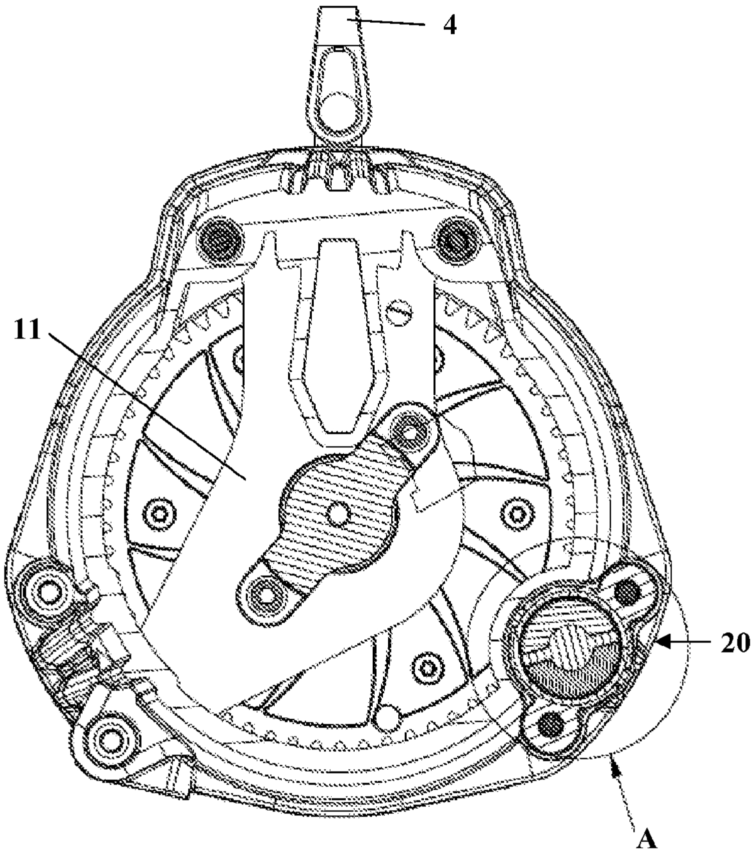
FIG. 2*c* is a front view of a cross-section through line G-G of the fall arrest device in FIG. 2*a;*
Figure 3:
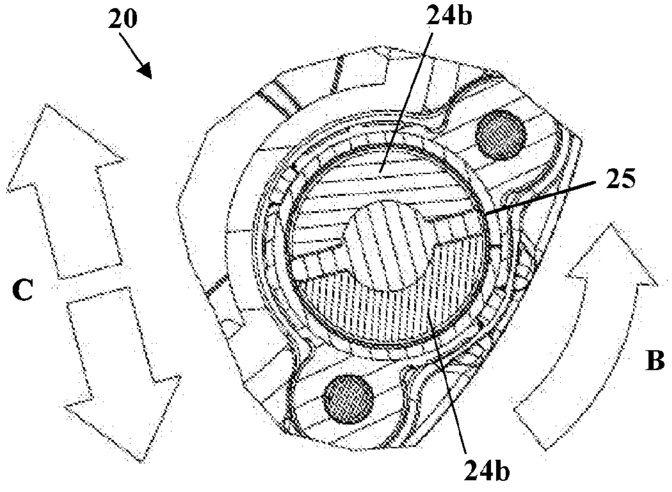
FIG. 3 is an expanded view of detail A of the fall arrest device in FIG. 2*c;*

FIG. 2*a* shows a side view of a non-limiting embodiment or aspect of the fall arrest device 10 with the front cover 1 secured to the main housing 2. In a non-limiting embodiment or aspect, and as best seen in FIGS. 2*b* and 3, the drum gear 9 is mounted on the rotary shaft 5 and rotates with the drum 6. The teeth of the brake gear 22 mesh with the teeth of the drum gear 9, such that when the drum gear 9 rotates in direction A the brake gear 22 rotates in an opposite direction, i.e., direction B. In this embodiment, both gears 9, 22 are rotatable in a first and second direction (i.e. clockwise and counter clockwise), such that the gears 9, 22 are bidirectional. FIG. 2*c* is a cross-section through the fall arrest device 10, which is nearer the front of the device 10 than in FIG. 2*b*, such that a chassis frame 11 and the outer components of the brake arrangement 20 are visible.

FIG. 3 shows an expanded view of the brake arrangement 20 in detail A of FIG. 2*c*. As the rotational speed of the brake gear 22 increases (i.e., in direction B), the centrifugal forces (or inertia) push the brake shoes 24*b* radially outwards on the rotatable seat 24*a* into the brake lining 25, as indicated by arrows C. The friction between the brake shoes 24*b* and the lining 25 slows down the rotation of the brake gear 22, which in turn applies a braking force to slow down the rotation of the drum gear 9. As the drum gear 9 rotates with the drum 6 onto which the lifeline is wound, this dampens the speed at which the lifeline is retracted and paid out. Thus, even if the connector 7 is released by the user when the lifeline is significantly unwound from the drum 6, the speed at which the lifeline retracts is controlled by the interaction between the drum gear 9 and the brake arrangement 20. This prevents a high impact collision between the connector 7 and the housing 1, 2. The dimensions and configuration of the brake gear can be tailored relative to the diameter of the drum gear 9 in order to tailor the breaking effect achieved, dependent upon factors such as the retraction spring force.

Figure 4A:
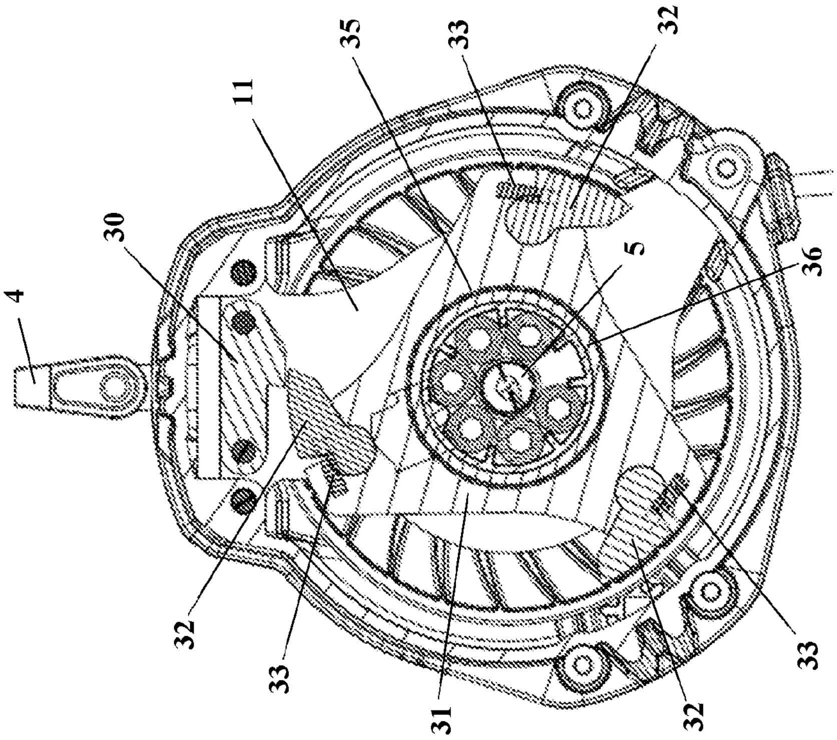
FIG. 4*a* is a rear view of a cross-section through line H-H of the fall arrest device in FIG. 2*a*, with the pawl in an unlocked position.
Figure 4B:
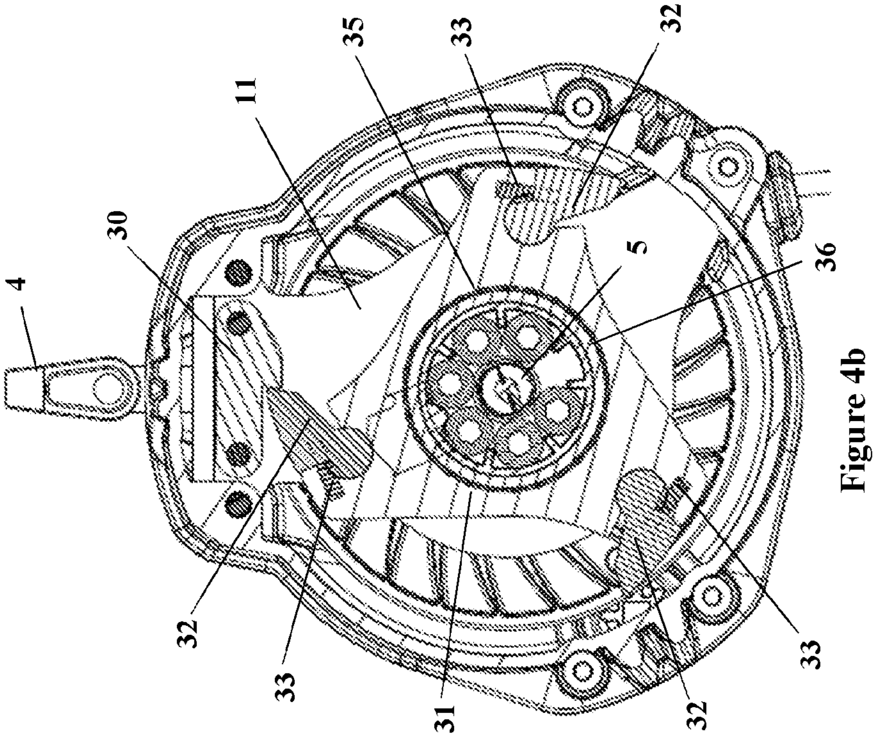
FIG. 4*b* is a rear view of a cross-section through line H-H of the fall arrest device in FIG. 2*a*, with the pawl in a locked position.

As is known with respect to SRL devices, retraction of the drum is typically achieved using a retraction spring device provided in the housing of the device and acting to bias rotation of the drum in a retraction direction with significant force to retract the drum to rewind the lifeline onto the drum. In a fall arrest event the lifeline pays out from the drum 6 at a higher speed than in normal "safe" payout situations. FIGS. 4*a* and 4*b* show the speed responsive mechanism and energy absorber arrangement of a SRL fall arrest system, which is arranged to inhibit rotation of the drum 6 above a predetermined rotational speed. This type of speed responsive mechanism and energy absorber arrangement is disclosed in detail in WO 2016/120614, the entirety of which is incorporated herein by reference.

In a non-limiting embodiment or aspect, and as shown in FIGS. 4*a* and 4*b*, a portion of the rotary shaft 5 that extends outwardly from an outer wall of the drum 6 includes or is in the form of a collar 36 to which is mounted an energy absorber ring 35. A pawl carrier 31 is mounted by the energy absorber ring 35 to the collar 36, such that, when fitted, the energy absorber ring 35 is energized. In particular, this is effectuated by providing an interference fit, such that the collar 36 and pawl carrier 31 effectively rotate together until an applied torque of a predetermined level is applied between the collar 36 and the pawl carrier 31.

In a non-limiting embodiment or aspect, the device 10 comprises a stop 30 disposed below the suspension eyelet 4, wherein the stop 30 is attached to the chassis frame 11. In this particular embodiment, the pawl carrier 31 comprises three pivotally-mounted pawls 32. The pawls 32 are spaced apart, with each pawl 32 being positioned at an apex of the pawl carrier 31. Each pawl 32 is biased radially inwards towards an inactive position by a respective biasing spring 33. In other non-limiting embodiments or aspects, more, or less than three pawls 32 may be provided.

When the lifeline is retracted or paid out at a speed which is lower than a predetermined threshold, the pawls 32 remain in the inactive position and the pawl carrier 31 simply rotates past the stop 30, as shown in FIG. 4*a*. In response to the drum 6 reaching the threshold rotational speed, the pawl carrier 31 and the pawls 32 are rotated against the biasing force of the springs 33. This causes the pawls 32 to pivot radially outwards into an active position, as show in FIG. 4*b*. In this position the pawls 32 cannot rotate past the stop 30 and so the pawl carrier 31 quickly locks in the position shown in FIG. 4*b*, thereby preventing the drum 6 from rotating and arresting a user's decent. Once this occurs, the pawl carrier 31 is locked against and fixed with respect to the stop 30, together with the collar 36, the shaft 5 and the drum 6. If the torque applied by the fall arrest event is sufficient, the drum 6 and the shaft 5 will tend to continue rotation.

The function of the resilient energy absorber ring 35 is to absorb energy and slow the rotation of the drum 6 when the speed responsive engagement mechanism is activated, as in FIG. 4*b*. In this case, the energy absorber ring 35 will rotate with either the collar 36 or the pawl carrier 31, and the relative rotation of the other of either the collar 36 or the pawl carrier 31 with respect to the energy absorber ring 35 will ensure energy is absorbed until the fall is completely arrested.

In a non-limiting embodiment or aspect, other known speed responsive mechanisms may be used, for example the ratchet and pawl speed responsive mechanism described in WO 2008/007119, the entirety of which is incorporated herein by reference.

In a non-limiting embodiment or aspect, the energy absorber ring may also be replaced by other known energy absorber arrangements, such as a friction brake device or plastically deformable metallic strip arrangements that are plastically deformed during deployment in order to absorb energy.

In a non-limiting embodiment or aspect, the drum gear and the brake gear can be replaced by rollers or other rotatable bodies. The rim of the drum (or a body attached to rotate with the drum) may act as a roller to drive a brake roller arrangement in place of a brake gear.

In a non-limiting embodiment or aspect, the drum gear or roller and the brake gear or roller may be configured to rotate in only a single direction. Thus, the brake arrangement may only be operable to damp the rotation of the drum in a single direction, either during retraction of the safety line or paying out of the safety line. A one-way bearing or "sprag clutch" may be utilized to achieve this one-way effect.

It will be appreciated that the brake arrangement does not have to be a centrifugal brake arrangement, as shown above. For example, the brake arrangement could be an eddy current brake arrangement.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. A fall arrest device, comprising:

an extendable and retractable lifeline wound about a rotatable drum;

a speed responsive mechanism arranged to stop the drum above a predetermined rotational speed; and a friction brake arrangement separate from the speed responsive mechanism, the friction brake arrangement comprising a brake mechanism and a rotatable brake body, wherein the rotatable brake body is arranged to rotate in response to rotation of the drum;

wherein a rotational axis of the rotatable brake body is offset from a rotational axis of the drum, wherein rotation of the rotatable brake body initiates the brake mechanism generating friction in the friction brake arrangement which applies a braking force to the drum as the lifeline is being retracted onto the drum, and wherein the rotatable brake body engages the rotatable drum, such that the rotatable drum drives the rotation of the rotatable brake body.

2. The fall arrest device of claim 1, wherein the rotational axis of the rotatable drum and the rotational axis of the rotatable brake body are in parallel.

3. The fall arrest device of claim 1, further comprising a driver portion directly or indirectly attached to and configured to rotate with the rotatable drum, the driver portion configured to drive the rotation of the rotatable brake body.

4. The fall arrest device of claim 3, wherein the driver portion comprises a drive ring arranged substantially coaxially with the drum.

5. The fall arrest device of claim 3, wherein the driver portion comprises a drive ring having a rotational axis that is coaxial with the rotational axis of the drum.

6. The fall arrest device of claim 3, wherein the driver portion comprises circumferential perimeter of the drum.

7. The fall arrest device of any of claim 3, wherein at least one of the driver portion and the rotatable brake body have gear or cog rings configured to drive the rotatable brake body.

8. The fall arrest device of claim 1, wherein the brake arrangement is a centrifugal brake arrangement.

9. The fall arrest device of claim 8, wherein the brake mechanism comprises at least one brake shoe slidably and/or float-mounted on the rotatable brake body, wherein, in response to rotation of the rotatable brake body, the at least one brake shoe is configured to slidably move outwards from an inactive position towards an active position, wherein in the active position the at least one brake shoe contacts an abutment surface, which slows the rotation of the rotatable brake body.

10. The fall arrest device of claim 9, wherein the at least one brake shoe is slidably and/or float-mounted on a rotatable seat driven by the rotatable brake body.

11. The fall arrest device of claim 9, wherein the abutment surface comprises a brake lining.

12. The fall arrest device of claim 8, further comprising a re-winding mechanism configured to rewind the lifeline onto the drum.

* * * * *